United States Patent
Valenti et al.

(10) Patent No.: US 8,193,787 B2
(45) Date of Patent: Jun. 5, 2012

(54) SYSTEM AND METHOD FOR REGULATING RMS VOLTAGE DELIVERED TO A LOAD

(75) Inventors: Leo F. Valenti, East Greenwich, RI (US); James C. Daly, Ave Maria, FL (US)

(73) Assignee: V Square/R, LLC, North Kingstown, RI (US)

( * ) Notice: Subject to any disclaimer, the term of this patent is extended or adjusted under 35 U.S.C. 154(b) by 0 days.

(21) Appl. No.: 13/006,948

(22) Filed: Jan. 14, 2011

(65) Prior Publication Data
US 2012/0007570 A1 Jan. 12, 2012

Related U.S. Application Data (60) Provisional application No. 61/361,639, filed on Jul. 6, 2010.

(51) Int. Cl.
*G05F 1/455* (2006.01)
(52) U.S. Cl. ......... 323/235; 323/241; 323/246; 323/300
(58) Field of Classification Search .................. 323/23, 323/241, 246, 300, 235, 237
See application file for complete search history.

(56) References Cited

U.S. PATENT DOCUMENTS

| | | | |
|---|---|---|---|
| 3,491,284 A | 1/1970 | Pascente | |
| 3,702,841 A | 11/1972 | Sawko | |
| 3,702,941 A | 11/1972 | Aiduck et al. | |
| 4,086,466 A | 4/1978 | Scharlack | |
| 4,334,147 A | 6/1982 | Payne | |
| 4,435,677 A | 3/1984 | Thomas | |
| 4,461,990 A | 7/1984 | Bloomer | |
| 4,485,296 A | 11/1984 | Ueda et al. | |
| 4,528,494 A | 7/1985 | Bloomer | |
| 4,565,958 A | 1/1986 | Cooper | |
| 4,567,425 A | 1/1986 | Bloomer | |

(Continued)

FOREIGN PATENT DOCUMENTS
JP 62060312 3/1987
(Continued)

OTHER PUBLICATIONS

Zhongren et al.; "Development of Three-Phase Intelligent Composite Switch in Reactive Power Compensation"; Power and Energy Conference [Online] 2010, pp. 1-4.

(Continued)

*Primary Examiner* — Jeffrey Sterrett
(74) *Attorney, Agent, or Firm* — Nixon Peabody LLP (57) ABSTRACT

A system and method for regulating the root mean square (RMS) voltage delivered to a load by an alternating current (AC) electrical circuit having a line voltage. To avoid radio frequency interference (RFI), the load is disconnected from the AC electrical circuit when energy stored in the load is at or near zero and is reconnected when the line voltage is at or near zero. Inductive loads are disconnected when the line current is at or near zero while capacitive loads are disconnected when the line voltage is at or near zero. The duration of the disconnection does not exceed one half-cycle of the fundamental frequency. Disconnections alternate between removing positive voltage half-cycles and negative voltage half-cycles to avoid a direct current (DC) bias. A system incorporating digital logic elements is provided for implementing the method and for detecting whether the load is inductive or capacitive.

20 Claims, 7 Drawing Sheets

U.S. PATENT DOCUMENTS

| | | | |
|---|---|---|---|
| 4,578,632 | A | 3/1986 | Laughton |
| 4,626,698 | A | 12/1986 | Harnden, Jr. et al. |
| 4,680,490 | A | 7/1987 | Baker et al. |
| 4,851,635 | A * | 7/1989 | Farrow .......................... 219/110 |
| 4,935,691 | A | 6/1990 | Lamar |
| 5,239,255 | A * | 8/1993 | Schanin et al. ............... 323/237 |
| 5,410,193 | A | 4/1995 | Backus et al. |
| 5,465,958 | A | 11/1995 | Brun |
| 5,483,149 | A | 1/1996 | Barrett |
| 5,583,423 | A | 12/1996 | Bangerter |
| 5,600,233 | A | 2/1997 | Warren et al. |
| 5,629,607 | A * | 5/1997 | Callahan et al. ............... 323/237 |
| 5,754,036 | A | 5/1998 | Walker |
| 6,172,488 | B1 | 1/2001 | Mizutani et al. |
| 6,172,489 | B1 | 1/2001 | Walker |
| 6,191,563 | B1 | 2/2001 | Bangerter |
| 6,246,034 | B1 | 6/2001 | Glaser et al. |
| 6,262,565 | B1 | 7/2001 | Williams et al. |
| 6,404,171 | B2 | 6/2002 | Saida |
| 7,193,337 | B2 | 3/2007 | Nguyen |
| 7,612,471 | B2 | 11/2009 | Schasfoort |
| 7,633,725 | B2 | 12/2009 | Premerlani et al. |
| 8,102,167 | B2 * | 1/2012 | Irissou et al. .................. 323/300 |
| 2009/0206818 | A1 | 8/2009 | Horan |
| 2009/0284182 | A1 * | 11/2009 | Cencur .......................... 315/307 |
| 2010/0039056 | A1 | 2/2010 | Kobayashi et al. |
| 2012/0007570 | A1 * | 1/2012 | Valenti et al. .................. 323/235 |

FOREIGN PATENT DOCUMENTS

| | | |
|---|---|---|
| JP | 7072849 | 8/1995 |
| JP | 09-073324 | 3/1997 |
| JP | 11-076586 | 3/1999 |
| JP | 2003-088158 | 3/2003 |

OTHER PUBLICATIONS

International Search Report for PCT/US2011/032961 dated Nov. 30, 2011, 3 pages.

Written Opinion for PCT/US2011/032961 dated Nov. 30, 2011, 5 pages.

Machine-generated English translation of JP 2003-088158, 21 pages.

Machine-generated English translation of JP 11-076586, 15 pages.

Machine-generated English translation of JP 09-073324, 15 pages.

* cited by examiner

SYSTEM AND METHOD FOR REGULATING RMS VOLTAGE DELIVERED TO A LOAD

CROSS REFERENCE TO RELATED APPLICATIONS

This application claims priority to U.S. Provisional Application No. 61/361,639, filed Jul. 6, 2010, the contents of which is incorporated entirely herein by reference.

FIELD OF THE INVENTION

The present disclosure relates generally to regulating power delivered to a load connected to an alternating current (AC) electrical circuit, and, more particularly, to a system and method for dynamically lowering the root mean square voltage delivered to the load by intermittently disconnecting the load from the AC electrical circuit.

BACKGROUND

Alternating current (AC) power distribution systems nominally deliver AC electrical power with a root mean square (RMS) voltage between 105 and 135 volts. Generally, RMS voltage delivered at points close to a power generation station is higher than at points further away. The further away points can have generally reduced RMS voltage due to, for example: resistive, inductive, and capacitive losses in the transmission lines between the power generation station and the point of delivery. Additionally, power drawn by devices attached to the line cause additional voltage variations. In jurisdictions where the power line voltages are poorly regulated, power controllers are required to protect electronics such as telecommunications equipment and computers to ensure that the protected devices do not draw more power than they are configured to handle safely. Thus power distribution systems conventionally deliver power that is both systematically variable (due to, for example, relatively fixed configurations of the power distribution system and transmission lines) and sporadically variable (due to, for example, constantly changing power loads drawing from a power grid that change the delivered power over short time periods).

Due to this variability, devices manufactured for operation on AC electrical power are generally configured to operate with a safety margin due to the known variability of supplied power. Devices can be configured to operate from RMS power line voltages between 95 and 135V. Some devices can be configured to operate from RMS voltages as low as 85 V. Devices configured to operate at voltages as low as 85 V waste power when they operate from a power supply of 135 V. Wasted power in such devices is dissipated as heat energy rather than providing useful functioning to the device or to a user of the device. Additionally, device manufacturers must undertake expense to create products that are configured to operate over a broad range of voltages and include components suitable for operation at supply voltages as high as 135 V. Conventional technologies for regulating RMS power delivered by an AC electrical power undesirably generate EMI (electromagnetic interference) and RFI (radio frequency interference) due to rapid switching employed by conventional devices to temporarily remove the load from the power supply and thereby reduce the delivered RMS voltage. In environments with wirelessly connected electronic devices, the existence of RFI creates noise that can disable such wireless devices.

Smart grid technologies are currently being introduced to allow the supply of electricity to be controlled by digital components. Some smart grid technologies provide promise of allowing an electrical power utility or electrical power user to control the time of operation of their electrical appliances according to constantly varying electricity prices, or according available to electrical supply in the grid. Some smart grid technologies allow for a user to program electrical appliances to automatically operate during times when electricity prices are low.

BRIEF SUMMARY

Provided herein is a system and method for regulating the root mean square (RMS) voltage delivered to a load by an alternating current (AC) electrical circuit having a line voltage. To avoid radio frequency interference (RFI) and electromagnetic interference (EMI), the load is disconnected from the AC electrical circuit when energy stored in the load is at or near zero and is reconnected when the line voltage is at or near zero. Inductive loads are disconnected when the line current is at or near zero while capacitive loads are disconnected when the line voltage is at or near zero. The duration of the disconnection can be less than one half-cycle of the fundamental frequency. Disconnections alternate between removing positive voltage half-cycles and negative voltage half-cycles to avoid a direct current (DC) bias. A system incorporating digital logic elements is provided for implementing the method and for detecting whether the load is inductive or capacitive.

Implementations of the present disclosure provide circuits for regulating the power delivered to loads and thereby allow electrical devices to operate with greater efficiency, and at lower cost. Implementations of the present disclosure for regulating RMS voltage are applicable to, without limitation, users of electrical devices seeking a way to reduce their energy consumption and save money, manufacturers of electrical devices seeking a means to provide a stable RMS power supply to their devices, and power utilities seeking a means to remotely and dynamically regulate RMS power delivered to loads on a power delivery system without generating RFI and EMI.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1A:
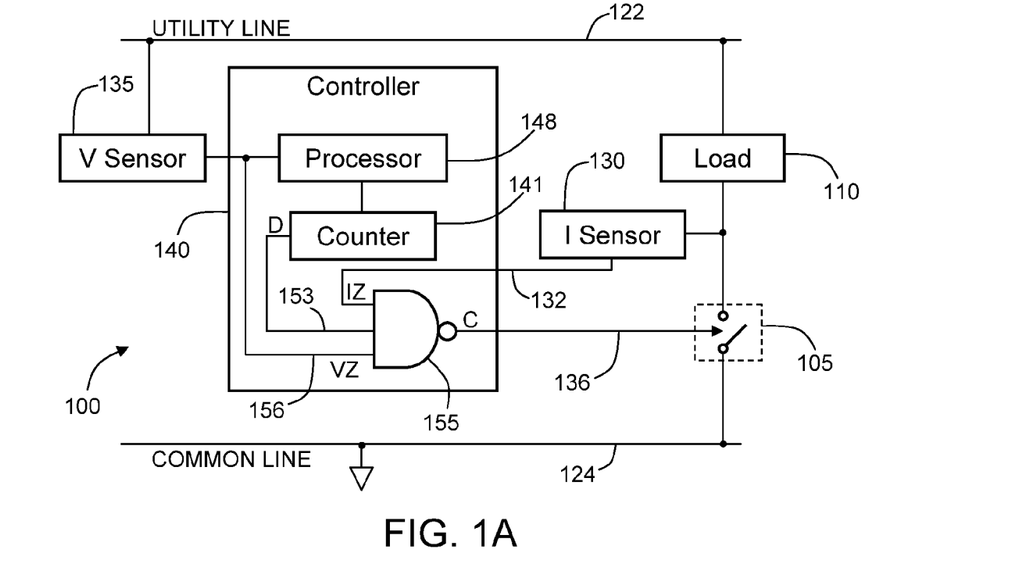
FIG. 1A is a functional block diagram of a circuit for regulating a root mean square (RMS) voltage delivered to a load.

FIG. 1A is a functional block diagram of a circuit 100 for regulating a root mean square (RMS) voltage delivered to a load 110. The circuit 100 includes a switching device 105 for disconnecting the load 110 from alternating current (AC) power delivery lines 122, 124. The AC power delivery lines 122, 124 can include a utility line 122 and a common line 124 as is conventionally employed in a single phase AC power delivery system. The utility line 122 can conduct an AC voltage or current that varies periodically with respect to the common line 124. The AC power delivery lines 122, 124 can be considered an AC electrical circuit. However, implementations of the present disclosure can be applied to AC power delivery systems including multiple phases of power supply current, such as a three-phase polyphase power delivery system. The switching device 105 is configured to operate according to a connect signal 136 issued by a controller 140. In an implementation, opening the switching device 105 disconnects the load 110 from the common line 124, and thereby disconnects the load 110 from the AC electrical circuit. Closing the switching device 105 connects the load 110 to the common line 124, and thereby connects the load to the AC electrical circuit and enables power to be delivered to the load 110 from the AC power delivery lines 122, 124.

In an implementation of the present disclosure, the controller 140 is configured to analyze the voltage or current applied to the load 110 and disconnect the load 110 from the AC power delivery lines 122, 124 when energy stored in the load 110 is at or near zero. The controller 140 is further configured to connect the load 110 when the line voltage is at or near zero. The controller 140 can disconnect the load 110 by issuing the control signal 136. By periodically removing the load 110 from the AC power delivery lines 122, 124, the circuit 100 can reduce the RMS voltage applied to the load 110. The combination of disconnecting the load 110 when the load has zero stored energy and reconnecting the load 110 when the line voltage is zero can be referred to below as a disconnection event or as removing the load 110 from the AC power delivery lines 122, 124. A disconnection event can have a duration of approximately one cycle of the fundamental frequency of the AC electrical circuit, or of approximately one-half cycle of the fundamental frequency. In an implementation, a disconnection event can also have a duration of greater than approximately one cycle of the fundamental frequency, such as a duration of approximately two cycles of the fundamental frequency or a duration of approximately one and one-half cycles of the fundamental frequency. In an example configuration, the peak voltage of the AC power delivery lines is not modified, but the RMS voltage applied to the load 110 can be decreased by intermittently and repeatedly removing the load 110 from the AC electrical circuit including the power delivery lines 122, 124.

The controller 140 can be configured to remove the load 110 from the AC power delivery lines 122, 124 for durations not exceeding one-half cycle of a fundamental frequency of the AC power delivery system or for durations not exceeding one cycle of the fundamental frequency. By disconnecting the load 110 when energy stored in the load 110 is zero and reconnecting the load when the line voltage is zero, the circuit 100 regulates the RMS voltage delivered to the load 110 while minimizing radio frequency interference (RFI) and electromagnetic interference (EMI). RFI and EMI can be generated by the electrical "shock" from switching high voltages and currents or by disconnecting loads with when energy is stored within the loads. Inductive loads store energy when current is flowing through them, and thus have zero stored energy when the current flowing through them is zero. Capacitive loads store energy when a voltage difference is applied across them, and thus have zero stored energy when the voltage across them is zero.

The controller 140 includes a processor 148 for analyzing the line voltage from a line voltage sensor 135, the load current from a load current sensor 130, and optionally the voltage across the load 110. The processor 140 is configured to analyze the received information and determine a rate of disconnection of the load 110 from the AC power delivery lines 122, 124 to achieve a desired RMS load voltage. The processor 148 can be configured to determine, for example, a number of cycles of the fundamental frequency of the power delivery system between disconnection events. By increasing the number of cycles between disconnection events, the RMS voltage applied to the load 110 is increased, as more cycles of the line voltage are applied to the load 110 over time. By decreasing the number of cycles between disconnection event, the RMS voltage applied to the load 110 is decreased, as less cycles of the line voltage are applied to the load 110 over time. In an implementation, the processor 148 can be configured, without limitation, as a logical circuit, a microprocessor, a field programmable gate array (FPGA), an application specific integrated circuit (ASIC), or any combination of these.

The controller 140 further includes a counter 141 for counting a number of zero-crossings of the line voltage. In an implementation, the counter 141 can be configured to count all zero-crossings (i.e., to count half-cycles of the AC voltage) or to count only positive-going or negative-going zero-crossings (i.e., to count full cycles of the AC voltage). The counter 141 can be electronically coupled to the processor 148 to allow the processor 148 to compare the number of zero-crossings incremented in the counter 141 with a desired number of zero-crossings between disconnection events. The counter 141 can be configured to issue a logical count signal 153 when the number of zero-crossings equal the target number determined by the processor 148. The logical count signal 153 can be a logical signal set to a logical low value until the counter 141 determines that the number of zero-crossings equals the target number of zero crossings and then the logical count signal 153 can have a logical high value for a duration of one cycle of the AC line voltage. The counter 141 can be further configured to reset to begin counting zero-crossings again from zero following the issuance of the logical count signal 153.

The controller 140 can further include a logical switching circuit for providing the connect signal 136 to the switching device 105. The logical switching circuit can include a NAND gate 155 having three inputs. The NAND gate 155 can receive inputs from the logical count signal 153, a logical load current signal 132, and a logical line voltage signal 156. The line voltage sensor 135 is connected to the utility line 122 for measuring a voltage on the utility line 122. The line voltage sensor 135 outputs a logical line voltage signal 156 indicative of the line voltage. The logical line voltage signal 156 can have a logical high value when the utility line 122 has a positive voltage relative to the common line 124 and can have a logical low value when the utility line 122 has a negative voltage relative to the common line 124. In FIG. 1A, the connect signal 136 is designated by the letter "C;" the logical load current signal 132 is designated by the letters "IZ;" the logical line voltage signal 156 is designated by the letters "VZ;" and the logical count signal 153 is designated by the letter "D."

The switching device 105 can be configured as, for example, a triac with the gate of the triac connected to the connect signal 136. While the switching device 105 is provided for switchably connecting the load 110 and the common line 124, any switch operating according to a command signal (such as the connect signal 136) can be used to connect and disconnect the load 110 from the AC power delivery lines 122, 124 in an implementation of the present disclosure. Alternatively, according to implementations of the present disclosure, the circuit 100' can be configured such that the load 110 is switchably connected to the utility line 122 without a switch between the load 110 and the common line 124 or is switchably connected to both the utility line 122 and the common line 124.

Figure 1B:
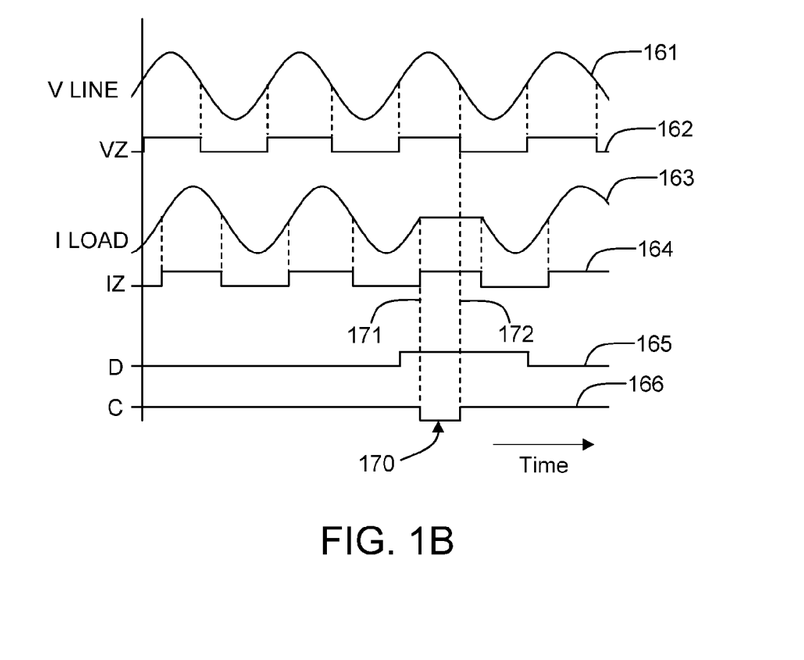
FIG. 1B provides symbolically illustrated waveforms of aspects of the circuit during an exemplary operation.

FIG. 1B provides symbolically illustrated waveforms of aspects of the circuit 100 during an exemplary operation of the circuit 100. Waveforms are shown for the line voltage (161), the logical line voltage signal (162), the load current (163), the logical load current signal (164), the logical count signal (165), and the connect signal (166). In an exemplary implementation of the operation of the circuit 100, the logical line voltage signal 156 is shown by the waveform 162 indicated by VZ; the logical load current signal 132 is shown by the waveform 164 indicated by IZ; the logical count signal 153 is shown by the waveform 165 indicated by D; and the connect signal 136 is shown by the waveform 166 indicated by C. As illustrated in FIG. 1B, the logical line voltage signal (162) is high when the line voltage is positive and low when the line voltage is negative. Similarly, the logical load voltage signal (164) is high when the load current is positive and low when the load current is negative. The connect signal 136, illustrated by waveform 166, is low (170) when all of the inputs (132, 136, 156) to the NAND gate 155 are simultaneously high (i.e., waveforms 162, 164, 165). When the connect signal 136 is low (170), the switching device 105 disconnects the load 110 from the AC electrical circuit. A disconnection event therefore occurs when the connect signal 136 is low (170). The exemplary implementation illustrated in FIG. 1B illustrates an example operation of the circuit 100 when the load 110 is an inductive load that has zero stored energy when the load current is zero. The disconnection event occurs between a disconnection time 171 and a reconnection time 172. The disconnection time 171 coincides with the load current (163) passing through a zero-crossing, thereby ensuring that the load 110 is disconnected while having stored energy at or near zero. The reconnection time 172 coincides with the line voltage (161) passing through a zero-crossing, thereby ensuring that the load 110 is connected when the line voltage is at or near zero voltage.

Additionally, in an implementation of the present disclosure, the controller 140 can be configured to repeatedly remove the load 110 from the AC electrical circuit for half-cycles of the fundamental frequency of line voltage while optionally alternating between positive voltage half-cycles and negative voltage half-cycles. Removing the load from positive voltage half-cycles and negative voltage half-cycles such that the number of half-cycles removed during positive voltage half-cycles approximately equals the number removed during negative voltage half-cycles advantageously assures that the RMS voltage applied to the load 110 has little or no DC component.

Figure 2A:
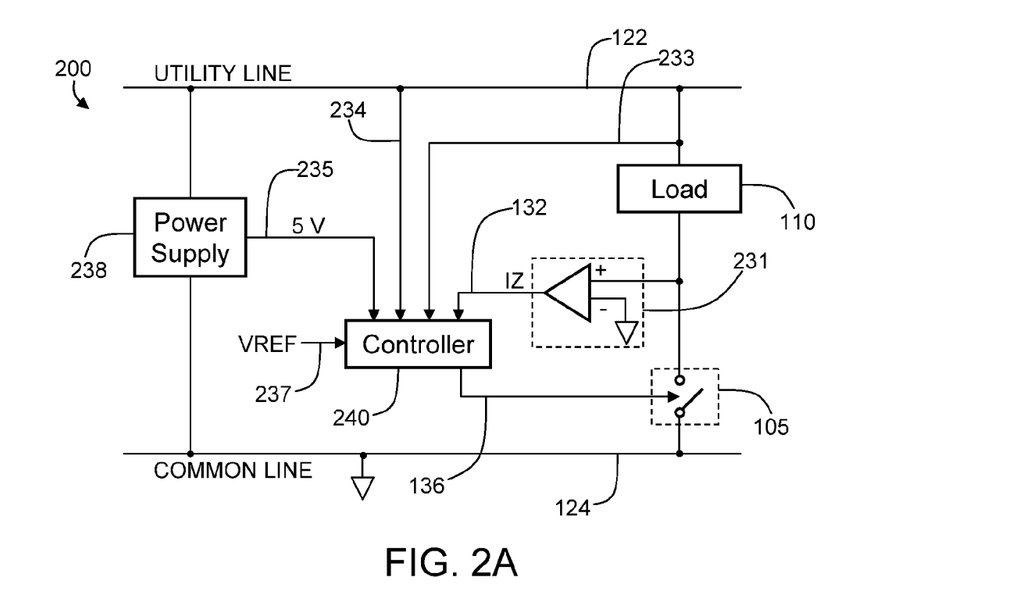
FIG. 2A is a block diagram of a circuit for regulating a root mean square (RMS) voltage delivered to the load.

FIG. 2A is a block diagram of a circuit 200 for regulating a root mean square (RMS) voltage delivered to the load 110. The circuit 200 includes the switching device 105 for disconnecting the load 110 from the AC power delivery lines 122, 124. Opening the switching device 105 disconnects the load 110 from the common line 124, and thereby disconnects the load 110 from the AC electrical circuit. Closing the switching device 105 connects the load 110 to the common line 124, and thereby connects the load 110 to the AC electrical circuit and enables power to be delivered to the load 110 from the AC power delivery lines 122, 124.

The circuit 200 also includes a controller 240. The controller 240 can be implemented as an application specific integrated circuit (ASIC), a field programmable gate array (FPGA), a microcontroller, or any combination of these. The controller 240 can incorporate logical circuitry for analyzing signals indicative of electrical characteristics of the AC power delivery lines 122, 124 to automatically determine how to operate the switching device 105 using the connect signal 136. The controller 140 receives power from a power supply 238 through a power supply connection 235. In an example implementation of the present disclosure, the power supply 238 can be a direct current (DC) power supply configured to supply 5 V to the controller 140 and can incorporate a conventional rectifier or current transformer as is conventionally appreciated by those skilled in the art of power systems monitoring and circuit design.

The controller 240 also receives a line voltage signal 234, a load voltage signal 233, and the logical load current signal 132. The controller 240 can also receive a reference voltage signal 237 for referencing or biasing the controller 240. In an implementation, the reference voltage signal 237 can optionally be a ground voltage. In an implementation, the reference voltage signal 237 can optionally be a voltage indicative of a desired RMS voltage to be applied to the load 110 and can be used within the controller 240 to compare the load voltage signal 233 with the reference voltage signal 237 to determine whether the RMS voltage applied to the load 110 should be adjusted. The line voltage signal 234 can be a logical or digital signal indicative of the voltage of the utility line 122. The line voltage signal 234 can also be an analog signal indicative of the voltage of the utility line 122 that is converted to a logical or digital signal using an analog-to-digital converter within the controller 240. The load voltage signal 233 can similarly be a logical or digital signal indicative of the voltage across the load 110, or can be an analog signal indicative of the voltage across the load 110. The logical load current signal 132 can be an output of a current sensor 231 and can be a logical or digital signal indicative of the current flowing through the load 110. For example, the logical load current signal 132 can be indicative of a voltage potential across a measurement burden. In an example configuration, the current sensor 231 can be coupled between the load 110 and the switching device 105. The current sensor 231 can be configured using, for example, an operational amplifier coupled on a high side between the switching device 105 and the load 110 and referenced to the ground voltage.

In an exemplary operation of the circuit 200, the utility line 122 is energized with alternating voltage and current relative to the common line 124. Using the energy delivered by the AC power delivery lines 122, 124, the power supply 238 rectifies the AC current and delivers 5 V DC power to the controller 240. The controller 240 also receives the load voltage signal 233, the logical load current signal 132, and the line voltage signal 234. In an implementation, the controller 240 is configured to determine a rate of disconnection of the load 110 from the AC power deliver lines 122, 124 in order to regulate the RMS voltage delivered to the load 110. By examining the line voltage signal 234 and the load voltage signal 233, the controller 240 determines when the line voltage equals zero and closes the switching device 105 when the line voltage equals zero. Implementations of the present disclosure provide for operating the controller 240 to connect the load 110 to the AC power deliver lines 122, 124 when the line voltage is zero.

In a configuration where the switching device 105 is a triac, the controller 240 can close the switching device 105 by biasing the gate of the switching device 105 with the connect signal 136. The controller 240 then continues to examine the logical load current signal 132, the load voltage signal 233, and the line voltage signal 234, and waits for a determined number of current or voltage zero crossings to occur in the AC current or voltage of the AC power deliver lines 122, 124 before disconnecting the load 110 by opening the switching device 105. The number of current or voltage zero crossings to wait before disconnecting can be determined in the controller 240 based on, for example, an amount of desired reduction in the RMS voltage delivered to the load 110 relative to the RMS voltage in the AC power deliver lines 122, 124. After the determined number of zero crossings have occurred, the controller 240 is configured to determine, based on the logical load current signal 132, when the current flowing through the load 110 is equal to zero, and open the switching device 105 when the current flowing through the load 110 is equal to zero. The switching device 105 can be opened by the controller 240 using the connect signal 136 to operate the switching device 105 by, for example, biasing or unbiasing a gate of a triac or a transistor. Following the disconnection of the load 110, the controller 240 can be further configured to reconnect the load 110 to the AC power delivery lines 122, 124 at the next zero of the line voltage, or at the zero of the line voltage following the next current or voltage zero crossing.

In an example implementation, disconnecting the load 110 until the next zero of the line voltage can remove the load 110 from the AC power deliver lines 122, 124 for a duration not exceeding one-half cycle of the AC current or voltage of the AC power delivery lines 122, 124. In an example implementation, disconnecting the load 110 until a second zero of the line voltage can remove the load 110 from the AC power deliver lines 122, 124 for a duration not exceeding one cycle of the AC current or voltage of the AC power delivery lines 122, 124. While the above description of an exemplary implementation references removing the load 101 when the line current is zero and reconnecting the load when the line voltage is zero, the present disclosure also applies to a circuit having a controller configured to disconnect the load 110 when the line voltage is zero, and applies to disconnection durations exceeding one-half cycle or one cycle of the AC current or voltage of the AC power deliver lines 122, 124.

Figure 2B:
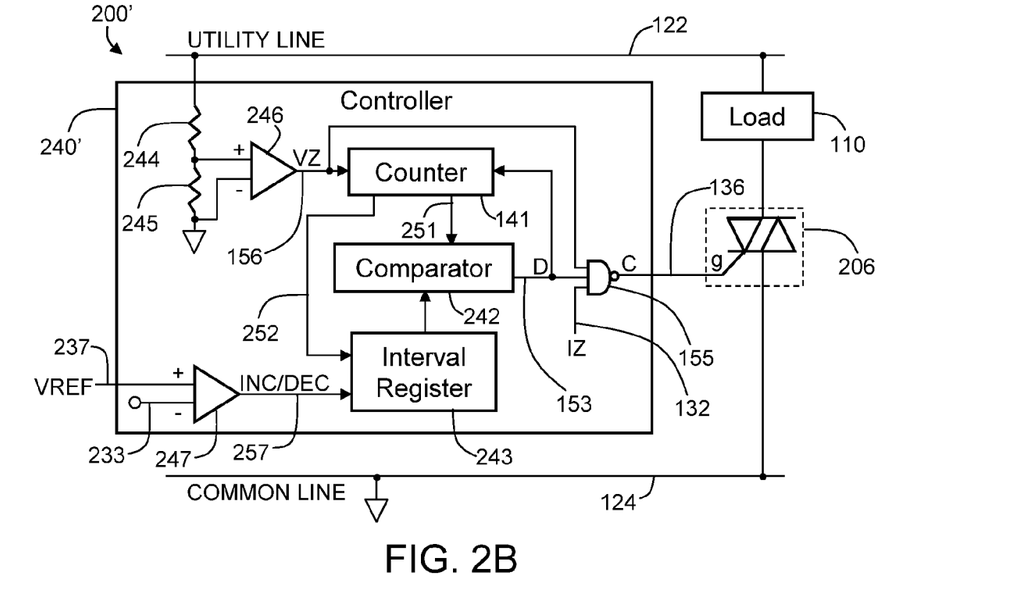
FIG. 2B is a block diagram of a circuit for regulating RMS voltage delivered to a load showing aspects of the controller.

FIG. 2B is a block diagram of a circuit 200' for regulating RMS voltage delivered to a load showing aspects of the controller 240'. The load 110 is connected between the utility line 122 and switchably connected to the common line 124. A triac switch 206 switches the connection between the load 110 and the common line 124 according to the control signal 136 applied to the gate of the triac switch 206. While the triac switch 206 is provided for switchably connecting the load 110 and the common line 124, any switch operating according to a command signal (such as the connect signal 136) can be used to connect and disconnect the load 110 from the AC power delivery lines 122, 124 in an implementation of the present disclosure. Alternatively, according to implementations of the present disclosure, the circuit 200' can be configured such that the load 110 is switchably connected to the utility line 122 without a switch between the load 110 and the common line 124 or is switchably connected to both the utility line 122 and the common line 124.

The controller 240' includes the counter 141, a comparator 242, an interval register 243, and the NAND gate 155. The output of the NAND gate 155 can be the connect signal 136. The NAND gate is connected to the logical line voltage signal 156, a logical load current signal 132, and a logical count signal 153. The NAND gate 155 is configured to have a high output to the connect signal 136 whenever at least one of its inputs (156, 153, 132) has a logical low value. The NAND gate 155 has a low output to the connect signal 136 whenever all of its inputs (156, 153, 132) have logical high values. The operation of the NAND gate 155 to provide the connect signal 136 is illustrated symbolically in FIG. 1B. According to an aspect of the present disclosure, the NAND gate 155 can be a logical switching circuit for providing the connect signal 136 to the triac switch 206 based on inputs indicative of the line voltage (156), the load current (132), and the cycle count (153).

The logical line voltage signal 156 can be an output of an operational amplifier 246 that receives inputs from the voltage potential across a measurement resistor 245. The measurement resistor 245 can be connected between the inputs to the operational amplifier 246, with one terminal of the measurement resistor 245 connected to the ground potential and the other connected to a first resistor 244. The first resistor 244 can be connected between the measurement resistor 245 and the utility line 122. In a configuration, the measurement resistor 245 can provide a voltage potential proportional to the AC voltage on the utility line 122 and the first resistor 244 can provide a voltage between the utility line 122 and a high input of the operational amplifier 246 to condition the voltage potential across the measurement resistor 245 to be in a range of sensitivity of the operational amplifier 246. For example, the first resistor 244 can condition the voltage potential by ensuring that the voltage potential across the measurement resistor 245 does not exceed 5 V. The logical load current signal 132 can be a logical output of a current sensor, which can be configured as an operational amplifier (such as the operational amplifier 231 shown in FIG. 2A). Implementations of the present disclosure also apply to a circuit configured to monitor current flowing in one or both of the AC power deliver lines 122, 124.

The counter 141 receives the logical line voltage signal 156 output from the operational amplifier 246 and counts zero-crossings of the AC line voltage by monitoring the logical line voltage signal 156. In an implementation, the counter 141 can be configured to count all zero-crossings (i.e., to count half-cycles of the AC voltage) or to count only positive-going or negative-going zero-crossings (i.e., to count full cycles of the AC voltage). The logical line voltage signal 156 can have a logical high value when the utility line 122 has a positive voltage relative to the common line 124 and can have a logical low value when the utility line 122 has a negative voltage relative to the common line 124. The counter 141 outputs a time signal 251 to the comparator 242. The time signal 251 can be indicative of the number of zero-crossings counted by the counter 141 since it was last reset, which number can be referred to as a present count number. The comparator 242 can compare the present count number to a target count number stored in the interval register 243. When the comparator 242 determines that the number of counts since the last reset equals the target count number, the comparator can be configured to set the logical count signal 153 to a logical high value for a duration of one cycle. The logical count signal 153 can also be received by the counter 141, which can be reset to begin counting zero-crossings again from zero. In an implementation, the logical count signal 153 can provide a reset signal to the counter 141.

The counter 141 also outputs an update signal 252 to the interval register 243. The update signal 252 can be a logical signal that is issued with the same frequency as the logical count signal 153, or can be a signal that is periodically issued according to the passing of a pre-determined or actively determined number of zero-crossings in the counter 141. In an implementation, the counter 141 can provide the update signal 252 according to a count of zero-crossings of the AC voltage that is optionally separate from the count used to provide the time signal 251. Responsive to receiving the update signal 252, the interval register 243 is configured to update the target count number stored in the interval register 243. In an implementation, the interval register can update the target count number by incrementing or decrementing the target count number according to an output of an operational amplifier 247. The interval register 243 can receive an increment/decrement signal 257 from the operational amplifier 247. The operational amplifier 247 can receive the reference voltage signal 237 on a positive terminal and the load voltage signal 233 on a negative terminal. In an example implementation, when the reference voltage signal 237 is greater than the load voltage signal 233, the interval register 243 increments the target count number, thereby causing the controller 240' to increase the number of cycles between disconnection events and increase the RMS voltage applied to the load 110. Similarly, when the reference voltage signal 237 is less than the load voltage signal 233, the interval register 243 decrements the target count number, thereby causing the controller 240' to decrease the number of cycles between disconnection events and decrease the RMS voltage applied to the load 110.

In alternative implementations to the circuit 200' provided in FIG. 2B, the interval register 243 can be replaced with a memory storage for storing the target count number and electronically communicating the target count number to the comparator 242. Additionally, the incrementing and decrementing of the target count number according to the output of the operational amplifier 247 can optionally be replaced with an algorithm for determining the target count number of half-cycles to remove from the load per second, N, according to Equation 1 with inputs indicative of the RMS load voltage (233) and the RMS line voltage (e.g., line voltage signal 234 shown in FIG. 2A). Such a determination can be carried out within a micro-controller, a processor, an ASIC, an FPGA, or an equivalent electronic device as appreciated by those skilled in the art of power systems monitoring and circuit design.

$$V_{LOAD} = V_{LINE} \sqrt{1 - \frac{N}{120}} \quad \text{(Equation 1)}$$

In Equation 1, $V_{LOAD}$ is the desired RMS voltage to apply to the load 110, and $V_{LINE}$ is the RMS voltage of the AC power delivery lines 122, 124. The factor of 120 is the number of half-cycles per second in an AC power delivery system operating at a fundamental frequency of 60 Hz. A similar expression can be created for AC power delivery systems operating at a fundamental frequency of 50 Hz by replacing the factor of 120 with 100. From Equation 1, the target number of full cycle counts to wait between disconnection events can be readily determined according to the relationship: Target=60/N, where again the factor of 60 comes from the fundamental frequency of the AC power delivery system. By substitution of this relationship into Equation 1, number of full cycles between disconnection events, Target, can be expressed independently of the fundamental frequency according to Equation 2.

$$\text{Target} = \left[ 2\left(1 - \left(\frac{V_{LOAD}}{V_{LINE}}\right)^2\right) \right]^{-1} \quad \text{(Equation 2)}$$

In implementations where the desired RMS voltage to apply to the load 110, $V_{LOAD}$ is a maximum desired voltage, the number Target can be rounded up to the next whole number ensure that the actual RMS voltage applied to the load 110 does not exceed $V_{LOAD}$. In implementations where $V_{LOAD}$ is a minimum desired voltage to apply to the load 110, Target can be rounded down to the next whole number to ensure that the RMS voltage applied to the load 110 does not drop below $V_{LOAD}$.

Figure 3A:
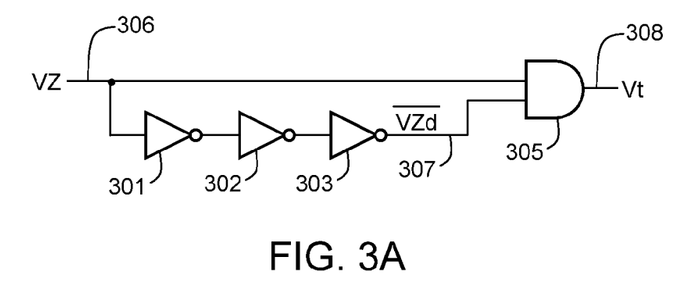
FIG. 3A provides a circuit diagram of a pulse generation circuit.
Figure 3B:
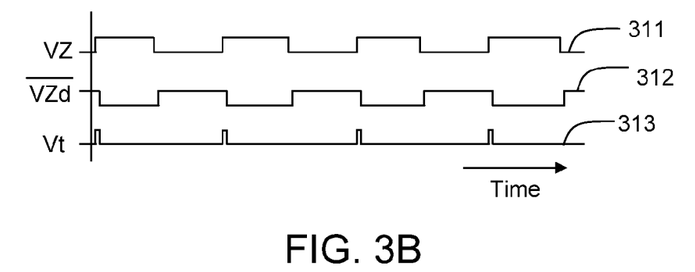
FIG. 3B provides symbolically illustrated waveforms of aspects of the pulse generation circuit shown in FIG. 3A during an exemplary operation of the pulse generation circuit.
Figure 3C:
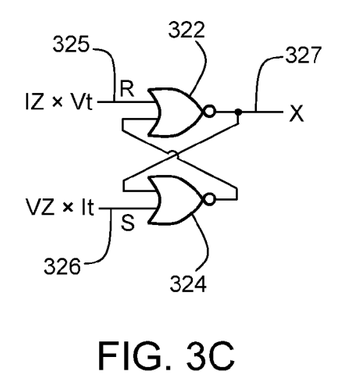
FIG. 3C provides a logical circuit for setting a logical load analyzer signal.

FIGS. 3A and 3C provide logical circuits useful for implementing a load analyzer for discriminating between inductive loads and capacitive loads and automatically adjusting the timing of disconnection events according to whether the load is inductive or capacitive.

FIG. 3A provides a circuit diagram of a pulse generation circuit. The pulse generation circuit is a logical circuit for creating a pulses indicative of a positive-going zero crossing of an input 306. The pulse generation circuit includes a first inverter 301, a second inverter 302, a third inverter 303, and an AND gate 305. The input 306 can be the logical line voltage signal 156, and is designated by "VZ" in FIG. 3A. The input 306 is connected to an odd number of inverters (e.g. 301, 302, 303) which delays and inverts the input 306 to provide a delayed and inverted signal 307. The delayed and inverted signal 307 is designated by $\overline{VZd}$ in FIG. 3A. The input 306 and the delayed and inverted signal 307 are input to the AND gate 305 and the output of the AND gate 305 is a pulse train signal 308.

FIG. 3B provides symbolically illustrated waveforms of aspects of the pulse generation circuit shown in FIG. 3A during an exemplary operation of the pulse generation circuit. The input 306 is illustrated by the waveform 311, which can be a logical signal indicating whether the line voltage signal 102 is positive or negative, and the changes from logical low to logical high of the waveform 311 can indicate the timing of zero-crossings in the line voltage. In FIG. 3B, a waveform 312 illustrates the logical values of the delayed and inverted signal 307. In an implementation, the delayed and inverted signal 307 is delayed with respect to the input signal 306 due to passing through the odd number of inverters (e.g., 301, 302, 303). A waveform 313 illustrates the pulse train signal 308 generated by logically multiplying the input 306 (i.e, waveform 311) the delayed and inverted signal 307 (i.e., waveform 313) in the AND gate 305. The pulse train signal 308 is designated in FIG. 3B as "Vt."

FIG. 3C provides a logical circuit for setting a logical load analyzer signal 327. The circuit shown in FIG. 3C receives a IZ AND Vt signal 325 and a VZ AND It signal 326. The IZ and Vt signal 325 is formed by a logical multiplication of a pulse train signal of the line voltage (Vt) and the logical load current signal (e.g., 132 in FIGS. 2A and 2B). The second input 326 is formed by a logical multiplication of a pulse train signal of the load current, which is designated as "It" in FIG. 3C, and the logical line current signal (e.g., 156 in FIGS. 2A and 2B). The logical multiplications can be achieved, for example, using an AND gate as is appreciated by those skilled in the art of circuit design. The logical circuit shown in FIG. 3C further includes a first NOR gate 322 and a second NOR gate 324. The first NOR gate 322 has a first input coupled to the IZ AND Vt signal 325 and a second input coupled to the output of the second NOR gate 324. The second NOR gate has a first input connected to the VZ AND It signal 326 and a second input coupled to the output of the first NOR gate 322. The output of the first NOR gate 322 also provides the logical load analyzer signal 327. The logical load analyzer signal 327 is designated as "X" in FIG. 3C. The logical circuit shown in FIG. 3C can be configured as an RS latch circuit. If the VZ AND It signal 326 is a logical high value, a positive current zero crossing has occurred when the voltage is positive. This indicates an inductive load where current lags voltage, and the VZ AND It signal 326 sets the logical load analyzer signal 327 to a logical high value. If the IZ AND Vt signal 325 is high, voltage lags current and the load is capacitive. When the IZ AND Vt signal 326 is high, the logical load analyzer signal 327 is reset to a logical low value. The circuit illustrated in FIG. 3C, in combination with two of the pulse generation circuit shown in FIG. 3A and additional AND gates to form the IZ AND Vt signal 326 and the VZ AND It signal 325 thereby provide a circuit outputting the logical load analyzer signal 327 that is logically high for inductive loads and logically low for capacitive loads.

Figure 3D:
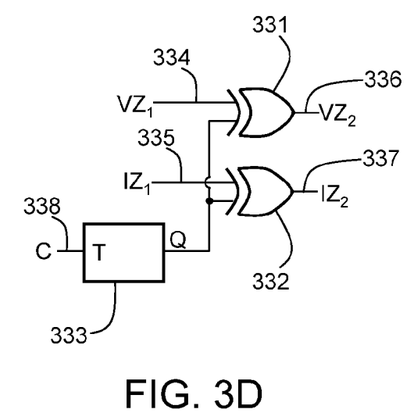
FIG. 3D provides a T flip-flop circuit for toggling the polarity of removed half-cycles.

FIG. 3D provides a T flip-flop circuit for toggling the polarity of removed half-cycles. The T flip-flop circuit includes a flip-flop unit 333 having an input 338 and an output, which is designated by "Q" in FIG. 3D. The output of the flip-flop unit 333 changes from high to low—or vice versa—whenever the input to the flip-flop unit 333 goes from a logical low value to a logical high value. In an implementation, the input 338 to the flip-flop unit 333 can be the connect signal 136, which is designated by "C" in FIG. 3D. The T flip-flop circuit further includes a first EXOR gate 331 and a second EXOR gate 332 to toggle the polarity of a logical line voltage signal 334 and a logical load current signal 335. The EXOR gates 331, 332 each receive the output of the flip-flop unit 333 as one input. The first EXOR gate 331 also receives the logical line voltage signal 334 as an input and outputs a toggled line voltage signal 336. The second EXOR gate receives the logical load current signal 335 as an input and outputs a toggled load current signal 337. Using the flip-flop circuit shown in FIG. 3D, it is possible to toggle the polarities of removed half-cycles by passing the outputs of the flip-flop circuit to, for example, a logical switching circuit (e.g., the NAND gate 155 shown in FIGS. 1A, 2B).

Figure 4:
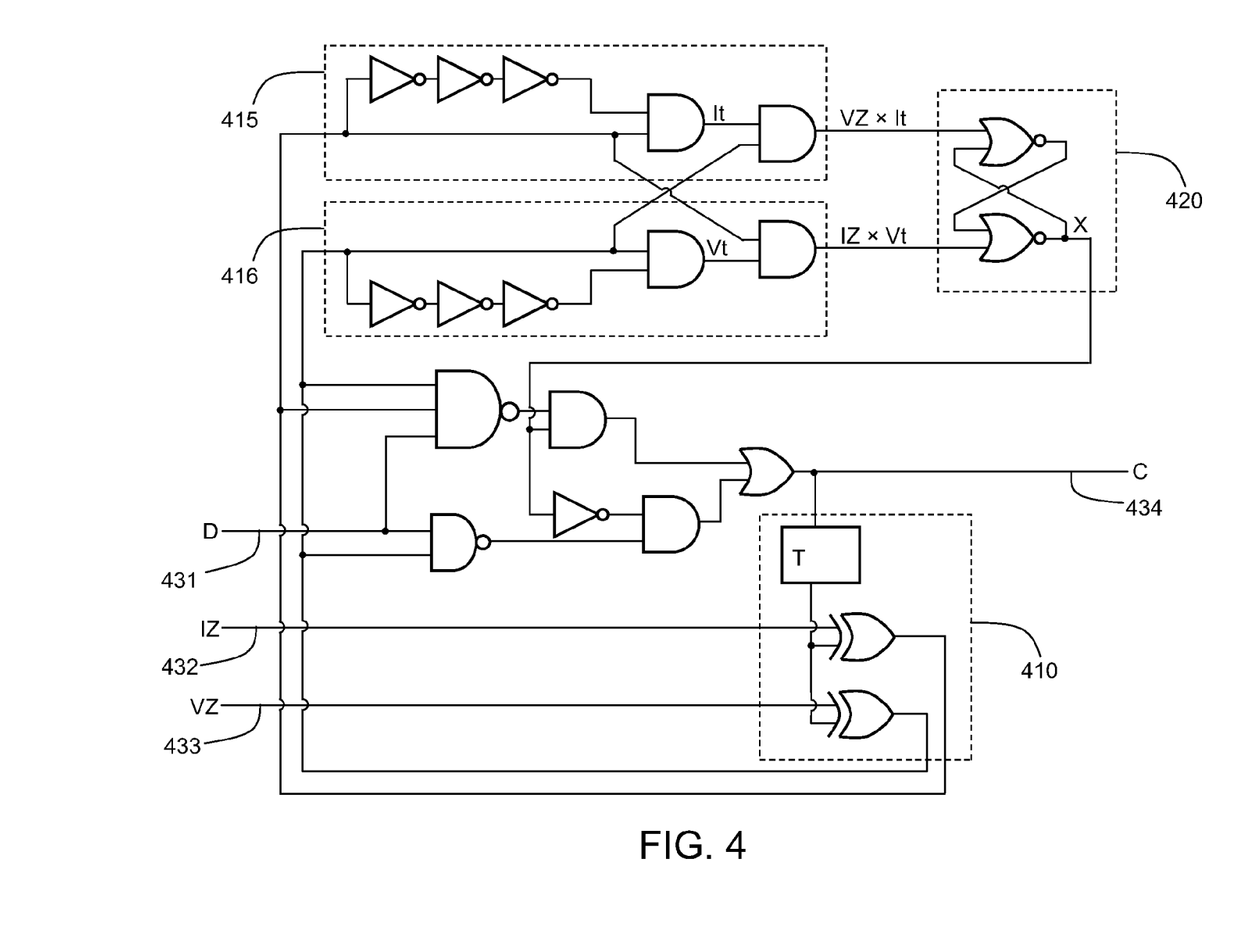
FIG. 4 illustrates a logical circuit for providing a load analyzer function and polarity toggling function within a controller for regulating RMS voltage.

FIG. 4 illustrates a logical circuit for providing a load analyzer function and polarity toggling function within a controller for regulating RMS voltage. The logical circuit shown in FIG. 4 includes components illustrated in FIGS. 3A, 3C, and 3D. The logical circuit of FIG. 4 receives a logical count signal 431, a logical load current signal 432, and a logical line voltage signal 433 and outputs a connect signal 434. The logical load current signal 432 and logical line voltage signal 433 are first passed through a flip-flop circuit 410 for toggling the polarity of the IZ and VZ logical signals. Included is a first pulse train generation circuit 415 for generating a current pulse train signal ("It") and a second pulse train generation circuit 416 for generating a voltage pulse train signal ("Vt"). The pulse generation circuits 415, 416 further include AND gates for producing the signals VZ AND It and IZ AND Vt for use by the RS latch circuit 420 to generate the load analyzer signal, which is designated by "X" in FIG. 4. In an implementation, the two pulse train generation circuits 415, 416 and the latch circuit 420 form a load analyzer circuit for automatically distinguishing between an inductive load and a capacitive load.

Using the logical circuit shown in FIG. 4, the connect signal can be provided according to Equation 3.

$$C = X\overline{DVZIZ} + \overline{X}\,\overline{DVZ} \qquad \text{(Equation 3)}$$

In Equation 3, X is the output of the RS latch circuit 420, which indicates whether the load is inductive (high value) or capacitive (low value). The combination of the NAND gates, the inverter, the AND gates, and the OR gate implement the logical expression of Equation 3 to provide the connect signal 434 that is appropriate for both inductive loads and capacitive loads.

Figure 5:
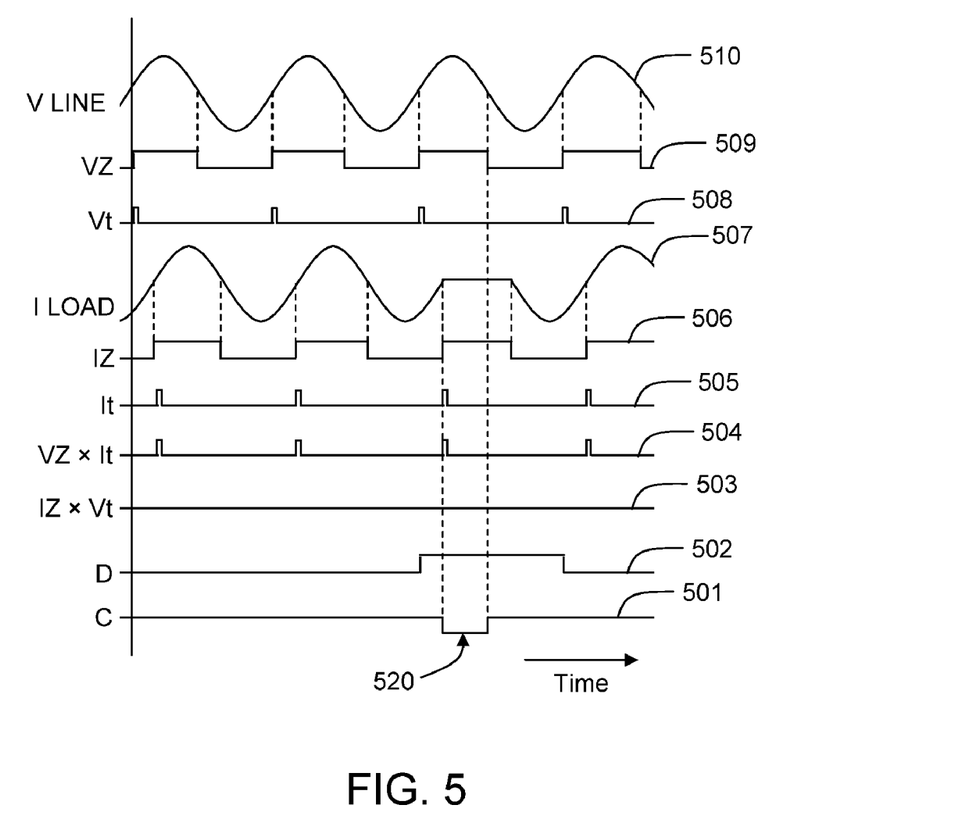
FIG. 5 symbolically illustrates exemplary waveforms of the logical circuit shown in FIG. 4.

FIG. 5 symbolically illustrates exemplary waveforms of the logical circuit shown in FIG. 4. Note that waveform 503, which symbolically represents the IZ AND Vt signal remains at a logical low value, which indicates that the load is inductive in the example provided and the output of the RS latch circuit 420 therefore remains at a high value, and is not reset to a low value.

Figure 6:
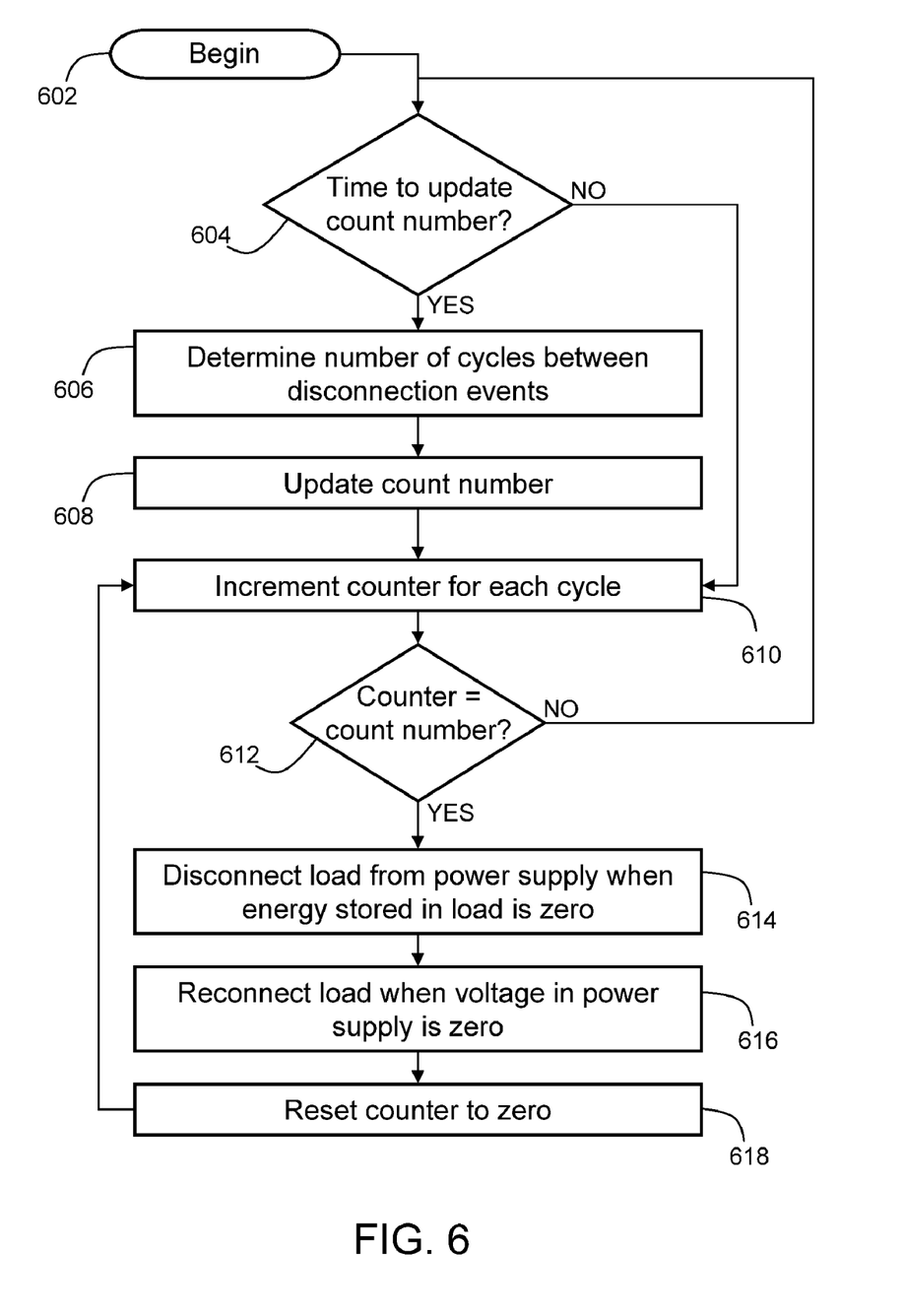
FIG. 6 is a flowchart of an example implementation of a method of operating a system for regulating RMS voltage.

FIG. 6 is a flowchart of an example implementation of a method of operating a system for regulating RMS voltage. In operation, a check is made within the processor to determine whether the target count number between disconnection events should be updated (604). If it is time to update the target number, the number of cycles between disconnection events is determined (606), and the target number is updated in a memory storage (606). The determination of the number of cycles between disconnection events can be completed in a processor (e.g., 140 in FIG. 1A) or by an interval register being incremented or decremented responsive to comparing a load voltage feedback signal with a reference voltage (e.g., interval register 243 receiving the increment/decrement signal 257 in FIG. 2B). Following the updating of the target number (608), a counter is incremented for each cycle of the fundamental frequency of the line voltage (610). The incrementing (610) can be carried out by, for example, the counter 141 shown in FIGS. 1A, 2A, and 2B.

If it is not time to update the target number (604), the determination of the number of cycles between disconnection events (606) and the updating of the target number (608) can be skipped, and the counter is incremented for each cycle (610). Following the incrementing (610) a determination is made as to whether the counter has reached the target count number (612). If the counter has not reached the target count number (612), a check can be made to see if it is time to update the target count number (604). If the counter is equal to the target number of cycles between disconnection events (612), the load (e.g., 110 in FIG. 1A) is disconnected from the power deliver system (e.g., 122, 124 in FIG. 1A) when energy stored in the load is at or near zero (614). The load is then reconnected when the line voltage is at or near zero (616). The combination of the disconnection when the load has zero stored energy (614) and the reconnection with the line voltage is zero (616) is a disconnection event that removes the load. Finally, the counter is reset to zero (618), and the method repeats by returning to incrementing the counter for each cycle (610). The method of FIG. 6 thus provides a continuous method of operating the circuits shown in FIGS. 1A, 2A, and 2B for regulating RMS voltage delivered to a load by repeatedly removing the load from an AC power delivery system.

Alternatively, if the counter has not reached the target number, the counter can continue to be incremented for each cycle (610), and following the resetting of the counter to zero (618), a check can be made to determine whether it is time to update the target number (604).

Figure 7:
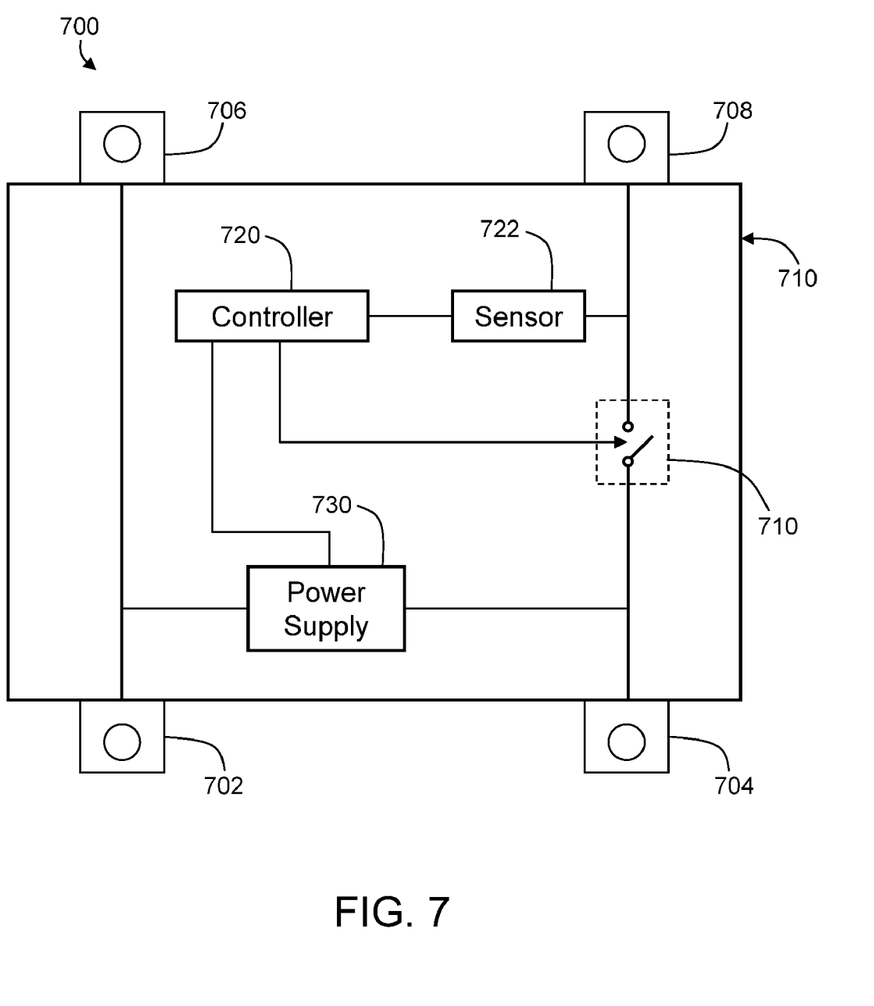
FIG. 7 is a block diagram of a device for regulating RMS voltage applied to a load.

FIG. 7 is a block diagram of a device 700 for regulating RMS voltage applied to a load. The device 700 includes a first electrical terminal 702, a second electrical terminal 704, a third electrical terminal 706, and a fourth electrical terminal 708. The first and second electrical terminals 702, 704 can be adapted to couple or connect to an AC electrical circuit, such as an AC electrical circuit that is a power delivery system with power delivery lines. The second and third terminals 706, 708 can be adapted to couple or connect across a load. The device 700 can also include a case 710 for housing internal components. In a configuration of the device 700 having the case 710, the terminals 702, 704, 706, 708 can be accessible from the exterior of the case 710. The case 710 can house a switching device 710, a controller 720, a sensor 722, and a power supply 730. In an implementation, the first terminal 702 and the third terminal 706 can be electrically coupled or connected; and the second terminal 704 and the fourth terminal 708 can be switchably coupled or connected through the switching device 710. The switching device 710 can be similar to the switching device 105 shown in FIG. 1A and can operate according to a connect signal from the controller 720. The power supply 730 can be connected between the first terminal 702 and the second terminal 704 and can provide a power supply to the controller 720. The power supply 730 can be similar to the power supply 238 shown in FIG. 2A. The sensor 722 can be connected to the fourth terminal 708 and can gather measurements indicative of a current flowing between the second terminal 704 and the fourth terminal 708 and provide such measurements to the controller 720. The controller 720, similarly to the controllers 140 of FIG. 1A, 240 of FIG. 2A, and 240' of FIG. 2B, can analyze the measurements from the sensor to determine a number of cycles between disconnection events to monitor an amount of energy stored in a load connected between the third and fourth terminals 706, 708. The controller 720 can issue the connect signal to the switching device 710 to disconnect the load when the amount of energy stored in the load is at or near zero and reconnect the load when the line voltage is at or near zero. The controller 720 can further include logical circuit elements such as the logical circuit elements illustrated in FIGS. 1A through 4 to analyze the load connected to the device 700 and determine whether it is inductive or capacitive and to toggle between removing the load during positive voltage half-cycles and negative voltage half-cycles.

In implementations of the present disclosure, loads protected by the circuits and devices for regulating RMS voltage can be individual electrical devices in a residential, commercial, or industrial setting and can include inductive motor loads, resistive loads, and capacitive loads. Additionally, such circuits can regulate the power delivered to an entire residential user by regulating the RMS voltage delivered to a residential service from a transformer, or from a substation. Such circuits can be implemented by power utilities to control RMS power delivered to individual homes, neighborhoods, or drawn from particular substations. Additionally, such circuits can be implemented within electrical devices by manufacturers to regulate the power delivered to the electrical device or can be added on to existing electrical devices by connecting electrical power to the device through a device incorporating an RMS regulating circuit, such as the device 700 shown in FIG. 7.

While the present disclosure has described a system and method for automatically determining the number of cycles between disconnection events of a load from an AC power delivery system, the present disclosure also applies to similar systems that do not automatically determine the number of cycles between disconnection events and instead have preconfigured and user-selectable settings to determine a number of cycles between disconnection events. Additionally, the number of cycles between disconnection events can be a supplied by an external source, such as an external source communicating through the internet as part of a smart grid system.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of reducing a root mean square (RMS) voltage delivered to a load from an alternating current (AC) electrical circuit including a first conductive line and a second conductive line wherein the first conductive line conducts a periodically varying voltage with respect to the second conductive line, the method comprising:
   determining a rate of disconnection of cycles or half-cycles of the periodically varying voltage to regulate the RMS voltage delivered to the load;
   determining an amount of electrical energy stored in the load;
   disconnecting the load from an AC electrical circuit responsive to energy stored in the load being at or near zero;
   connecting the load to the AC electrical circuit responsive to the voltage of the AC electrical circuit being at or near zero; and
   repeating the disconnecting and the connecting at the determined rate of disconnection.

2. The method of claim 1, wherein the disconnecting is carried out responsive to the current in the AC electrical circuit being at or near zero.

3. The method of claim 1, wherein the disconnecting is carried out responsive to the voltage in the AC electrical circuit being at or near zero.

4. The method of claim 1, wherein the periodically varying voltage is oscillating at a fundamental frequency, the periodically varying voltage having a zero crossing for each half-cycle, and wherein the disconnecting and the connecting are carried out to remove the load from the AC electrical circuit for a duration not exceeding one cycle of the fundamental frequency.

5. The method of claim 1, wherein the periodically varying voltage is oscillating at a fundamental frequency, the periodically varying voltage having a zero crossing for each half-cycle of the fundamental frequency, and wherein the disconnecting and the connecting are carried out to remove the load from the AC electrical circuit for a duration not exceeding one half-cycle of the fundamental frequency.

6. The method of claim 5, further comprising:
   repeating the disconnecting and the connecting to repeatedly remove the load from the AC electrical circuit for durations not exceeding one half-cycle of the fundamental frequency.

7. The method of claim 6, further comprising:
   determining, based on the determined rate of disconnection, a number of cycles of the fundamental frequency to continuously connect the load to the AC electrical circuit between disconnection events, wherein each disconnection event includes one of the repeated disconnecting and connecting the load so as to remove the load from the AC electrical circuit, and prior to the disconnecting, counting a number of zero crossings of the fundamental frequency corresponding to the determined number of cycles of the fundamental frequency.

8. The method of claim 6, wherein the determining the rate of disconnection is carried out by determining a rate of disconnection of half-cycles of the periodically varying voltage to regulate the RMS voltage delivered to the load and the repeating the disconnecting and the connecting is carried out by repeatedly removing the load from the AC electrical circuit at the determined rate of disconnection.

9. The method of claim 6, wherein the disconnecting and the connecting are carried out by removing the load from the AC electrical circuit during positive voltage half-cycles and during negative voltage half-cycles, over time the number of half-cycles removed during positive voltage half-cycles being substantially equal to the number of half-cycles removed during negative voltage half-cycles.

10. The method of claim 6, wherein the disconnecting and the connecting are carried out by alternating between removing the load from the AC electrical circuit during positive voltage half-cycles and during negative voltage half-cycles.

11. The method of claim 1, the method further comprising:
determining whether the load is capacitive or inductive, and
wherein the disconnecting is carried out: responsive to the current in the AC electrical circuit being at or near zero responsive to the load being determined to be inductive, or responsive to the voltage in the AC electrical circuit being at or near zero responsive to the load being determined to be capacitive.

12. A system for regulating a root mean square (RMS) voltage delivered to a load by an alternating current (AC) electrical circuit, the AC electrical circuit including a first conductive line and a second conductive line, wherein the first conductive line conducts a periodically varying voltage with respect to the second conductive line, the periodically varying voltage having a zero crossing for each half-cycle, the system comprising:
a sensor for detecting electrical energy stored in the load, the sensor having a logical output;
a switch for disconnecting the load from the second conductive line and reconnecting the load to the second conductive line, the switch operated by a control signal; and
a controller coupled to the sensor and the switch, the controller comprising:
a processor for determining a number of half-cycles of the periodically varying voltage to continuously apply to the load between disconnecting the load from the AC electrical circuit using the switch, the number of half-cycles determined according to a function including a measured or estimated value of a voltage difference between the first conductive line and the second conductive line;
a counter for counting the number of half-cycles of the periodically varying voltage, the counter operably connected to the processor; and
a logical switching circuit for providing the control signal to the switching mechanism, the logical switching circuit electronically connected to the counter and to the logical output of the sensor.

13. The system of claim 12, wherein the logical switching circuit includes a logical NAND gate, and wherein the control signal is connected to the output of the logical NAND gate, the NAND gate having inputs connected to a first logical signal, a second logical signal, and a third logical signal, wherein the first logical signal is based on a voltage of the AC electrical circuit, the second logical signal is based on a current of the AC electrical circuit, and the third logical output is based on the determined number of half-cycles.

14. The system of claim 13, wherein the logical switching circuit includes a logical gate for inverting the first logical signal and the second logical signal following the disconnection event.

15. The system of claim 13, wherein the switch is configured to remove the load from the AC electrical circuit for a duration not exceeding one half-cycle of the fundamental frequency, and wherein the logical switching circuit includes a logical gate for ensuring that the load is alternately removed from the AC electrical circuit during positive voltage half-cycles and negative voltage half-cycles.

16. The system of claim 12, wherein the logical switching circuit includes a load analyzer for determining whether the load is inductive or capacitive, and wherein the control signal activates the switch at time points based on an output of the load analyzer.

17. The system of claim 16, wherein the load analyzer comprises:
a voltage pulse AND gate having a first input connected to a logical signal of the voltage of the AC electrical circuit, and a second input connected to the output of an odd number of inverters connected in series to the logical signal of the voltage of the AC electrical circuit;
a current pulse AND gate having a first input connected to a logical signal of the current of the AC electrical circuit, and a second input connected to the output of an odd number of inverters connected in series to the logical signal of the current of the AC electrical circuit;
a first AND gate having a first input connected to an output of the voltage pulse AND gate, and a second input connected to the logical signal of the current of the AC electrical circuit;
a second AND gate having a first input connected to an output of the current pulse AND gate, and a second input connected to the logical signal of the voltage of the AC electrical circuit;
a first NOR gate having a first input connected to the output of the first AND gate, a second input, and an output; and
a second NOR gate having a first input connected to the output of the second AND gate, a second input connected to the output of the first NOR gate, and an output connected to the second input of the first NOR gate.

18. An apparatus for regulating a root mean square (RMS) voltage delivered to a load, comprising:
a first and second conductive terminals adapted to be connected to an alternating current (AC) electrical circuit;
a third and fourth conductive terminals adapted to be connected across the load, the fourth conductive terminal electrically connected to the second conductive terminal;
a switching mechanism electrically connected between the first conductive terminal and the third conductive terminal for disconnecting the first terminal from the third terminal, the switching mechanism configured to operate based on a control signal;
a sensor for determining an amount of electrical energy stored in the load, the sensor having a logical output; and
a controller in electronic communication with the switching mechanism and the sensor, wherein the controller is configured to determine a rate of disconnection of cycles or half-cycles of the AC electrical circuit from the load to regulate the RMS voltage delivered to the load by outputting the control signal to the switching mechanism based in part on the logical output from the sensor such that:

the load is disconnected from the AC electrical circuit, via the switching mechanism, responsive to energy stored in the load being at or near zero, the load is connected to the AC electrical circuit, via the switching mechanism, responsive to the voltage of the AC electrical circuit being at or near zero, and the disconnection and connection of the load are repeated at the determined rate of disconnection.

19. The apparatus of claim 18, wherein the controller comprises:

a processor for determining a rate of activation of the switching mechanism according to a function including a measured or estimated value of the voltage difference between the first conductive terminal and the second conductive terminal;

a counter for counting a number of zero crossings of a voltage potential between the first conductive terminal and the second conductive terminal, the counter operably connected to the processor; and a logical switching circuitry for providing the control signal to the switching mechanism, the logical switching circuitry electronically connected to the counter and to the logical output of the sensor.

20. The apparatus of claim 19, wherein the controller further comprises:

a load analyzer for determining whether a load is inductive or capacitive, the load analyzer comprising:

a voltage pulse AND gate having a first input connected to a logical signal of the voltage of the AC electrical circuit, and a second input connected to the output of an odd number of inverters connected in series to the logical signal of the voltage of the AC electrical circuit;

a current pulse AND gate having a first input connected to a logical signal of the current of the AC electrical circuit, and a second input connected to the output of an odd number of inverters connected in series to the logical signal of the current of the AC electrical circuit;

a first AND gate having a first input connected to an output of the voltage pulse AND gate, and a second input connected to the logical signal of the current of the AC electrical circuit;

a second AND gate having a first input connected to an output of the current pulse AND gate, and a second input connected to the logical signal of the voltage of the AC electrical circuit;

a first NOR gate having a first input connected to the output of the first AND gate, a second input, and an output; and a second NOR gate having a first input connected to the output of the second AND gate, a second input connected to the output of the first NOR gate, and an output connected to the second input of the first NOR gate.

* * * * *